Patented Feb. 8, 1944

2,341,306

UNITED STATES PATENT OFFICE 2,341,306

POLYVINYL KETALS AND THEIR PREPARATION

Courtland L. Agre, George L. Dorough, and William E. Hanford, Wilmington, Del., assignors to E. I. du Pont de Nemours & Company, Wilmington, Del., a corporation of Delaware No Drawing. Application May 20, 1939, Serial No. 274,804

13 Claims. (Cl. 260—66)

This invention relates to polyvinyl ketals and, more particularly, to polyvinyl ketals of non-cyclic ketones and their method of preparation.

The preparation of synthetic resins identified as polyvinyl acetals and prepared by reacting polyvinyl alcohol or a partially hydrolyzed polyvinyl ester with an aldehyde, is well known. Also, polyvinyl ketals have been prepared heretofore by reacting polyvinyl alcohol or a partially hydrolyzed polyvinyl ester with cyclic ketones such as cyclohexanone. However, it has not been possible to condense polyvinyl alcohol or a partially hydrolyzed polyvinyl ester with other ketones in this simple manner to form polyvinyl ketals.

An object of the present invention is to provide new synthetic resins. A further object is to provide a method of preparing new polyvinyl ketals, more especially polyvinyl ketals of non-cyclic ketones, that is, ketones of the formula: R—CO—R' wherein R and R' are the same or different aliphatic or aromatic radicals. Other objects of the invention will be apparent from the description given hereinafter.

The above objects are accomplished according to the present invention by reacting polyvinyl alcohol and a monomeric ketal of a ketone having the formula: R—CO—R', R and R' being aliphatic or aromatic radicals and alike or different By the term "monomeric ketal" is meant a ketal formed from a monomeric (non-polyeric) monohydric or polyhydric alcohol and a ketone. More specifically, the invention comprises reacting polyvinyl alcohol and a dialky ketal of the ketone as above described in a substantially anhydrous solvent vehicle in the presence of a condensation catalyst of acid reaction.

While it has not been possible to condense directly ketones of the formula:

R—CO—R'

with polyvinyl alcohol to give the corresponding polyvinyl ketal, it has now been found that new polyvinyl ketals of this type may be readily prepared by means of interchange reaction between polyvinyl alcohol and monomeric ketals of these ketones, the monomeric ketals and their preparation being known.

As the products of the present invention are similar in nature to the polyvinyl acetals obtained from polyvinyl alcohol and aldehydes, it is believed that, in the present reaction, one molecule of the ketal interchanges with two hydroxyl groups in the polyvinyl alcohol. Hence the reaction would occur in the following manner although not all hydroxyl groups are necessarily reacted in the final resin:

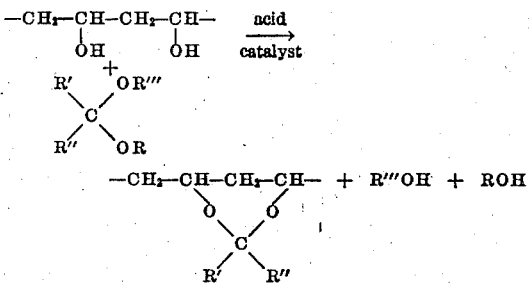

(R, R', R" and R'" are aliphatic or aromatic radicals.)

In the preferred practice of this invention, a mixture of polyvinyl alcohol, the specific ketal to be employed, a condensation catalyst of acid reaction, and methyl or anhydrous ethyl alcohol as the solvent medium is agitated and heated at a convenient temperature during a period of time sufficient for the formation of a homogeneous solution, and usually for an additional period of time in order to produce the maximum obtainable or the desired extent of interchange reaction. The products obtained in this manner have good solubility in organic solvents, have good resistance towards moisture absorption, are very tough, are thermo-plastic, and in general, have higher softening temperatures than polyvinyl acetals with the same carbon content in the carbonyl constituent.

It has been found that the dimethyl or diethyl ketals of acetone, methyl ethyl ketone, methyl propyl ketone, acetophenone, and methyl n-amyl ketone are particularly satisfactory for the interchange reaction with polyvinyl alcohol under the conditions of this invention. In the same manner other ketals of various other ketones with the general formula

R—CO—R', such as diethyl ketone, propiophenone, ethyl propyl ketone, di-propyl ketone, benzophenone, mesityl oxide, methyl vinyl ketone, methyl cyclohexyl ketone, etc., may be employed.

The following examples are given to illustrate specific embodiments of the invention, proportions being given in parts by weight in grams unless otherwise stated:

*Example 1*

A mixture of 550 parts of polyvinyl alcohol  (obtained by the hydrolysis of polyvinyl acetate), 1640 parts of 2,2-di-ethoxybutane, 2000 parts of anhydrous methanol, and 11 parts of concentrated sulfuric acid was heated at about 55° C. for 5½ hours. Within ten minutes after starting the heating the original suspension became a solid mass which then very quickly changed into a clear, viscous solution. After 5½ hours the acid catalyst was neutralized by sodium hydroxide dissolved in methanol, and the solution was diluted to about 10 liters and filtered. The resin was precipitated in granular form by adding water to the agitated solution, and then was washed well with several changes of water. The product was suspended in a solution of water and methanol (ratio of 2:1) which contained sufficient potassium hydroxide to make the mixture alkaline to phenolphthalein. The resin was kept in suspension by stirring, and the mixture was warmed at about 50-55° C. for 1¼ hours—maintaining a basic solution by addition of potassium hydroxide. The resin became sufficiently soft during this heating to facilitate thorough washing and stabilization. The liquid was drained off and the treatment was repeated for ½ hour with fresh liquor. The resin then was washed five times with water and was allowed to stand for 10 minutes in water which contained 1 cc. of triethanolamine. The resin was then isolated and dried.

The resin had good color, softened at about 82° C., and had 72.5% of its hydroxyl groups united with the ketone, as indicated by analysis by acetylation. It was soluble in ethanol, isopropanol, acetic acid, dioxan, ethoxyethyl alcohol and ethanolbenzene mixtures.

Example 2

A mixture of 11 parts of polyvinyl alcohol, 50 parts of anhydrous ethanol, 0.35 part of concentrated sulfuric acid, and 22 parts of 2,2-di-ethoxybutane was heated at about 55° C. for 4¼ hours. The clear solution thus obtained was made basic with a solution of sodium methylate in methanol, and the diluted solution was shaken with water to precipitate the resin. The resin was washed thoroughly with water and then dried. A molded chip of the product softened at 82° C., and analysis indicated 72% reaction of the hydroxyl groups.

Example 3

A mixture of 11 parts of polyvinyl alcohol, 33 parts of 2,2-diethoxypropane, 40 parts methanol, and 0.2 part of concentrated sulfuric acid was heated at 50-60° C. for 5 hours. The acid catalyst was neutralized by addition of sodium hydroxide, the solution was diluted to 200 cc. with methanol, and the resulting solution was filtered. The resin was precipitated by the addition of water, was thoroughly washed, and then was dried. A chip formed from this product had very good color and softened at 88° C. The resin was soluble in a wide range of organic solvents.

Example 4

A mixture of 11 parts of polyvinyl alcohol, 42 parts of anhydrous ethanol, 0.55 part of concentrated sulfuric acid, and 32 parts of 2,2-diethoxypentane was heated at 55-65° C. for 5 hours. The acid was neutralized with sodium hydroxide dissolved in methanol, and the solution was diluted to 200 cc. with ethanol to give a clear, viscous solution. The resin was precipitated in granular form by the addition of water to the vigorously agitated solution. The resin was washed well with water and allowed to stand in water for several hours. It then was heated for about one hour at 50-60° C. in a water-ethanol mixture (3:1) made slightly basic with potassium hydroxide. Finally it was thoroughly washed with water and dried. The product formed a tough chip which softened at about 65° C.

Example 5

A mixture of 11 parts of polyvinyl alcohol, 36.6 parts of the diethyl ketal of acetophenone, 85 parts of glacial acetic acid, one part of acetic anhydride, and 0.8 cc. of perchloric acid was heated at about 55° C. for 3½ hours. A small amount of sodium methylate was added, and the resin solution was diluted to 200 cc. with acetic acid to give a clear, light yellow solution. The resin was precipitated by pouring a thin stream of the solution into vigorously stirred water, and then was washed well with water. The product was stabilized by heating in an ethanol-water mixture (1:1), made slightly basic, at about 50-60° C. for 2 hours. The resin thus obtained softened at 98° C.

Example 6

A mixture of 11 parts of polyvinyl alcohol, 0.35 part of concentrated sulfuric acid, and 95 parts of a solution of 2,2-dimethoxybutane in methanol (27.5% by weight of ketal) was heated at about 60° C. for 3 hours. The clear, viscous solution was made alkaline by the addition of sodium methylate and was diluted to 200 cc. with methanol. The resin was precipitated by the addition of water, and was stabilized by essentially the same treatment employed in Example 1. The product molded into a chip of good color which softened at 84° C.

Although various dialkyl ketals were used in all the preceding examples, it has been found possible to obtain similar resins by interchanging polyvinyl alcohol with cyclic ketals obtained from ketones and monomeric polyhydric alcohols, such as ethylene glycol and pentaerythritol. The reaction between the ketal and the hydroxyl groups apparently occurs in the following manner:

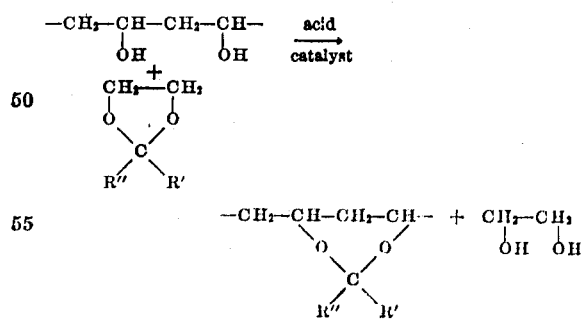

(R' and R'' are aliphatic or aromatic radicals).

Example 7

A mixture of 11 parts of polyvinyl alcohol, 80 parts of anhydrous methanol, 0.9 part of sulfuric acid, and 40 parts of the cyclic ketal of ethylene glycol and methyl ethyl ketone (2-methyl-2-ethyldioxolane-1,3) was heated at about 55° C. for 5 hours. The acid catalyst then was neutralized, and the solution was diluted to 200 cc. with methanol. The resin was washed well with water, stabilized by heating in a water made slightly basic with potassium hydroxide, allowed to stand in water containing a small amount of triethanolamine, and finally was dried. The chip prepared from this material softened at 76° C.

The same type of product was obtained by replacing the above dioxolane with 30.5 grams of the cyclic ketal of pentaerythritol and methyl ethyl ketone. In general, these products are not quite as completely reacted as those of the former examples.

In all of the preceding examples, the polyvinyl alcohol employed contained but a very slight percentage of residual ester groups (0–5%). The following example indicates that an analogous reaction and product can be obtained by the use of a partially saponified polyvinyl ester.

*Example 8*

A mixture of 12 parts of polyvinyl alcohol (Saponification No. 180; 16% polyvinyl acetate by moles), 50 parts of anhydrous ethanol, 0.35 part of sulfuric acid, and 22 parts of 2,2-diethoxybutane was heated at about 55° C. for 6½ hours to give a clear, viscous solution. The acid catalyst was neutralized with potassium hydroxide, the solution was diluted, and the resin was precipitated. It was washed thoroughly with water, and then was allowed to stand for several hours in water made alkaline with ammonium hydroxide. The dried product molded into a chip which softened at about 78° C.

While, in the previous examples, the dialkyl ketals were isolated before use, it is possible to prepare the ketals in situ, or even to use other materials which give the same results as the ketals in this reaction. Thus, the alcoholic solution of the reaction product of ethyl orthoformate, for example, and a ketone can be used, as also can be employed the unsaturated ether formed by the loss of one molecule of alcohol from the ketal, probably according to the following general equation:

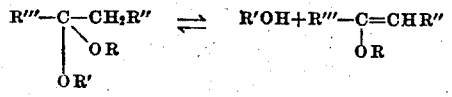

(R and R' are aliphatic or aromatic radicals).

*Example 9*

A mixture of 11 parts of polyvinyl alcohol, 30 parts of 2-methoxybutene-1

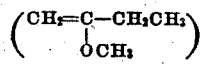

125 parts of anhydrous ethanol, and 0.9 part of sulfuric acid was heated at about 60° C. for 5¼ hours, giving a clear solution. The catalyst was neutralized by addition of ammonium hydroxide, and the resin was precipitated by the addition of water. The product was washed thoroughly with water and then was dried. The resin so obtained formed a tough chip which softened at 82° C. It was soluble in ethanol, acetic acid, ethoxyethyl alcohol and ethanol-benzene mixtures.

*Example 10*

A mixture of 11 parts of polyvinyl alcohol, 37 parts of ethyl orthoformate, 14.5 parts of acetone, 40 parts of anhydrous ethanol, and 0.4 part of sulfuric acid was heated at about 65° C. for 2½ hours. The solution was diluted and the resin was precipitated by addition of water. The resin was thoroughly washed and dried. A chip was light yellow in color, softened at 93° C., and had 66% of its hydroxyl groups combined with the ketone.

In addition to these polyvinyl ketals of only one ketone, it is possible also by this invention to form mixed products from two or more ketals, and from ketals and various aldehydes and hydroaromatic ketones.

*Example 11*

A mixture of 11 parts of polyvinyl alcohol, 16 parts of 2,2-diethoxybutane, 13 parts of 2,2-diethoxypropane, 40 parts anhydrous methanol, and 0.25 part of sulfuric acid, was heated at about 55° C. for 4½ hours. The resin was isolated as in Example 4. A chip of this product was tough, and softened at about 81° C.

*Example 12*

A mixture of 11 parts of polyvinyl alcohol, 11.5 parts of 2,2-diethoxybutane, 6.2 parts of 1,1-diethoxybutane, 40 parts of anhydrous methanol, and 0.3 part of sulfuric acid was heated at about 55° C. for 2¾ hours. The resin was isolated and stabilized by the process of Example 4. A chip of the material softened at 72° C., and 61% of the hydroxyl groups had reacted.

*Example 13*

A mixture of 11 parts of polyvinyl alcohol, 5.5 parts of benzaldehyde, 100 parts of anhydrous acetic acid, and 1.2 cc. of 85% phosphoric acid was heated at about 60° C., and after ½ hour 12 parts of 2,2-diethoxybutane was added. Heating was continued an additional 3½ hours. The solution was diluted to 200 cc. with acetic acid. The resin was precipitated by pouring a thin stream of the solution into vigorously stirred water, and then was thoroughly washed. It was allowed to stand for several hours in dilute ammonium hydroxide and finally was heated for ½ hour in ethanol-water (1:1), made basic with sodium hydroxide. It then was washed and dried. A chip molded from this material softened at 116° C.

*Example 14*

A mixture of 11 parts of polyvinyl alcohol, 100 parts of anhydrous acetic acid, 1.2 cc. of 85% phosphoric acid, and 4.4 parts of methacrolein was heated at about 60° C. for 1½ hours. Then 10 parts of 2,2-diethoxybutane was added, and heating was continued for an additional 2½ hours. The product was isolated as in Example 13. A chip formed from the material was light yellow in color, was tough, and softened at 87° C.

The following example illustrates the interchange reaction of the present invention carried out under pressure.

*Example 15*

A mixture of 11 parts of polyvinyl alcohol, 18.5 parts of 2,2-dimethoxybutane, 45 parts of methanol, and 0.2 part of sulfuric acid was agitated and heated under pressure of approximately 2½ to 3 atmospheres in a closed vessel at 100° C. for 2⅓ hours. A clear, somewhat viscous solution formed very soon after the heating was commenced. The acid catalyst then was neutralized by the addition of sodium methoxide, and the solution was diluted with methanol. The resin was precipitated by adding water to the solution, was thoroughly washed with water, and was stabilized by heating at 55° C. for ½ hour in a mixture of water and ethanol (2:1) which had been made slightly basic by the addition of potassium hydroxide. The washed and dried resin could be molded into a nearly colorless chip.

The following examples illustrate the effect of various solvent mediums on the preparation of polyvinyl ketals according to the present invention:

Example 16

A mixture of 11 parts of polyvinyl alcohol, 18.5 parts of 2,2-dimethoxybutane, 27.7 parts of methyl ethyl ketone, and 0.3 part of sulfuric acid was heated at about 60° C. for 2 hours. The acid catalyst was then neutralized by the addition of potassium hydroxide in methanol. The solution was further diluted and the resin was precipitated by adding water to the clear solution. The product was washed with water, and then was stabilized by the method of Example 4. Analysis indicated that 76% of the hydroxyl groups had united with the ketone.

Repetition of this example under similar conditions except that only 13.5 parts of 2,2-dimethoxybutane was used, produced a resin in which about 66% reaction had been obtained.

Example 17

This ketal was made under conditions similar to Example 16 except that ethyl acetate was employed as the solvent. Analysis indicated that 74% of the hydroxyl groups had united with the ketone.

Example 18

A mixture of 11 parts of polyvinyl alcohol, 46.2 parts of 2,2-dimethoxybutane, and 0.3 part of sulfuric acid was heated at 60° C. for 2 hours. The clear, viscous solution was made alkaline and then was diluted with ethanol. The resin was precipitated from the clear solution by the addition of water, and then was washed and stabilized. Analysis indicated 85% reaction.

In carrying out the reaction of the present invention water must be excluded from the reaction vessels and the reactants due to the fact that ketals in the presence of water and acid catalyst are rapidly and quite completely hydrolyzed into the ketone and alcohol. This difficulty can be avoided by maintaining practically anhydrous conditions.

It will be understood that the above examples are merely illustrative and that the polyvinyl ketals herein considered may be prepared under widely varying conditions. In general the reaction is carried out by suspending the polyvinyl alcohol in a solution of the ketal and catalyst in a suitable solvent, and then heating the reaction mixture until the reaction has attained the maximum obtainable or the desired extent. The amounts of ketals or their equivalents can be varied over a wide range, depending upon the experimental conditions employed and the extent of the reaction desired.

It has been found that for most purposes it is desirable to prepare polyvinyl ketals in which over sixty per cent of the hydroxyl groups have united with the ketone, although for some purposes it might not be necessary or desirable to have this high a degree of reaction. The extent of reaction can be determined by completely acetylating the remaining hydroxyl groups in the resin with a standardized solution of acetic anhydride in pyridine, and then titrating the excess acetic anhydride, thereby obtaining the amount of the reagent required for the acetylation. From this value it is possible to calculate the percentage of hydroxyl groups which remain unreacted in the resin. This result can be confirmed by liberating the combined ketone by hydrolysis of the resin and then quantitatively determining the ketone as its 2,4-dinitrophenyl hydrazone.

A great variety of monomeric ketals of non-cyclic ketones may be employed in the reaction of the present invention. Preferably, the dialkyl ketals are used but any ketals of the general formula:

$$R-\underset{\underset{OR''}{|}}{\overset{\overset{R'}{|}}{C}}-OR'''$$

R, R', R'' and R''' being either the same or different aliphatic or aromatic radicals, are adapted for use. Also, cyclic ketals of R—CO—R' ketones may be used as, for example, those formed with the polyhydric alcohols, ethylene glycol and pentaerythritol. Further, ketals of the general formula:

$$R-\underset{\underset{OR}{|}}{\overset{\overset{C}{|}}{C}}-\underset{\underset{OR}{|}}{\overset{\overset{C}{|}}{C}}-R$$

and ketal-acetals of the general formula:

$$R-\underset{\underset{OR}{|}}{\overset{\overset{C}{|}}{C}}-\underset{\underset{OR}{|}}{\overset{\overset{C}{|}}{C}}-H$$

the R's representing the same or different aliphatic or aromatic radicals, may be employed.

It is not necessary to have the ketal actually present at the start of the reaction, as any systems of materials capable of forming the intermediate ketals in situ are equally applicable. Thus, instead of 2,2-diethoxybutane, for example, one can use 2-ethoxybutene-1, since, when an alcohol is present in the reaction mixture, this material readily adds a molecule of alcohol to form the corresponding ketal. Also, instead of preparing the dialkyl ketal from ethyl orthoformate and the ketone and isolating the ketal before use, it is possible to add an ortho-formic ester and the desired ketone to the polyvinyl alcohol in acidic alcohol and obtain the polyvinyl ketal. These modifications are not limited to this particular example, but all systems capable of producing the ketals in situ are equally applicable. Among these systems are: (1) the use of mercaptoles, which interchange with alcohols to form ketals; (2) the use of imino ethers, which react with the ketones to form ketals; (3) alkyl orthosilicates, which give ketals when treated with ketones; (4) dialkyl sulfites, which similarly form ketals; (5) certain acetylenes, which add alcohols to form ketals, and all other similar processes. In using these systems, the polyvinyl alcohol either can be present during the formation of the intermediate ketal or can be added after the desired ketal has been formed.

Methyl alcohol and anhydrous ethyl alcohol have been found to be suitable solvents in this process, although other organic solvents such as acetic acid, ethyl acetate, methyl ethyl ketone, chloroform, or excess monomeric ketal, and the like, and solvent mixtures such as alcohol and ester mixtures, also can be employed. The choice of the solvent to be used in any instance is somewhat dependent upon the solubility characteristics of the particular polyvinyl ketals being prepared. It is desirable to choose such a solvent that a homogeneous solution is formed during the reaction since this insures the obtaining of more uniform products. The presence of even small amounts of water in the solvents is very detrimental, and efforts should be made to maintain anhydrous systems. However, very small amounts of water can be present, although this reduces the extent of interchange reaction obtained from a definite amount of intermediate ketal.

Any condensation catalyst of acid reaction can be employed in the process of this invention. Among these catalysts are strong inorganic acids, such as various acids of sulfur, phosphorus and chlorine, SO₂, boron trifluoride and its complexes with organic molecules, and relatively strong organic acids, such as the chloracetic acids, aromatic and aliphatic sulfonic acids, etc. It is also possible to use certain salts of acid reaction, such as aluminum chloride, stannic chloride, zinc chloride, etc. It has been found, however, that sulfuric acid is one of the most efficient of these catalysts and its use is generally satisfactory. The quantity of catalyst employed in the reactions can be varied greatly, and the amount is best determined by experimental means. The characteristics of the products sometimes can be altered somewhat by varying the amounts of catalysts used in their preparation.

The most desirable temperature range for the reaction is about 40–80° C., although the process can be carried out both at higher and lower temperatures than the range cited. Although the pressure at which the reaction is carried out can be varied, it is most convenient to use atmospheric pressure or pressures higher than this value as illustrated in Example 15.

The time required for the reaction is largely dependent on the experimental conditions and the degree of reaction sought. It is desirable to carry out the reaction for a sufficiently long period of time to allow the formation of a solution of the resin in the solvent, and it is advantageous to continue for an additional period of time in order to reach the maximum obtainable or the desired degree of reaction. Usually a solution is formed within the first hour of reaction, and it appears that a longer period of heating than about eight hours usually causes only very little additional reaction.

In most of the examples the polyvinyl alcohol employed contained very small amounts of ester groups although Example 8 illustrated the invention as applied to a polyvinyl alcohol containing an appreciable percentage of acetate groups. Either 100% polyvinyl alcohol or a partially saponified polyvinyl ester ranging from 0% to 100% ester groups can be used but the use of polyvinyl alcohol with only a small or negligible percentage of ester groups is preferred.

The polyvinyl alcohol can be prepared by the hydrolysis of any polyvinyl ester, such as the acetate, propionate, etc., and from mixed polyvinyl esters, such as the acetate-stearate, and can contain ester groups remaining after these mixed esters have been preferentially saponified. Also, polyvinyl alcohols obtained from mixed polymers of vinyl esters with other polymerizable materials can be used providing that these mixed polymers can be saponified to products which have hydroxyl groups in the correct position for polyvinyl ketal formation. Furthermore, the polyvinyl alcohols can be derived from polyvinyl esters of any degree of polymerization, but the preferred polyvinyl alcohol is derived from polyvinyl esters (as the acetate, for example) whose molar solution in benzene has a viscosity at 20° C. between 1 and 350 centipoises, and, more preferably, in the range of 10–100 centipoises. Furthermore, it is possible to use as the starting materials only partially formed polyvinyl acetals and ketals.

It is possible, also, to form mixed polyvinyl ketals or mixed polyvinyl ketals-acetals. Thus, polyvinyl alcohol can be treated with mixtures of two or more ketals, such as those of acetone and methyl ethyl ketone, in order to prepare mixed polyvinyl ketals, or it can be treated with mixtures of ketals and cyclic ketones. Also, one or more ketals and one or more aldehydes (such as aliphatic saturated aldehydes, benzaldehyde, furfural, methacrolein, etc.) and/or acetals of these aldehydes can be reacted with polyvinyl alcohol to give mixed polyvinyl ketals-acetals. In such reactions the various reactants can be added either simultaneously or separately, depending on the desired nature of the final resinous product. In all instances, the amounts of the various reagents can be varied as desired.

Before precipitating the polyvinyl ketal by the addition of water, it has been found desirable to partially or completely neutralize the acid catalyst in order to prevent any hydrolysis of the polyvinyl ketal and the remaining unreacted intermediate ketal. For this neutralization, various basic materials such as sodium hydroxide, potassium hydroxide, ammonium hydroxide, sodium methylate, sodium ethylate, sodium carbonate, various organic bases (amines), and similar materials can be employed. However, it is not always necessary to neutralize the acid catalyst before precipitating the resin. Also, when very viscous solutions of the resins result from the interchange reaction, it has been found desirable to dilute the solution before precipitating the resin. The resin usually is obtained in granular or thread form, depending on the method of its precipitation. Furthermore, the resin need not be precipitated from the solution, but sometimes can be used directly for coating materials, adhesives, etc., by directly applying the solution followed by removal of the solvent.

The precipitated resin can be treated in any of many different ways. It merely can be thoroughly washed with water and then dried, although the resins obtained by this process often are not as stable as those which are given further treatment. It is possible to allow the resin to remain for several hours in water or other medium (made slightly basic) in order to effect a stabilization of the product. The most desirable method is to place the freshly precipitated and washed (by water) product in a mixture of alcohol (or similar solvent) and water which has been made slightly basic (pH of about 8 to 12) with potassium hydroxide or other basic materials, and to heat the mixture at about 40–80° C., depending on the product from about ½ to 5 hours. The product can then be washed well with water and dried. Furthermore, it sometimes is advantageous to add to the wash water a small amount of a stabilizing agent. Among these agents are organic amines, such as triethanolamine, diethylcyclohexylamine, dimethylcyclo-hexylamine, triamylamine, the butylamines, ethylcyclohexylamines, and similar organic bases. Furthermore, polyhydric phenols, such as hydroquinone and pyrogallol, can be used.

In products which contain residual ester groups which can be advantageously removed, the product can be treated in suspension in a liquid such as water or in solution with a basic material (sodium hydroxide, potassium hydroxide, etc.) to effect this saponification. Also, the number of remaining hydroxyl groups can sometimes be advantageously reduced by treating the product with gaseous or liquid materials, such as formaldehyde, ketenes, organic isocyanates, acid anhydrides, etc.

In order to isolate the product in a finely divided form, it is possible to prepare or dissolve the polyvinyl ketal in a solvent of low-boiling point, such as methyl chloride, sulfur dioxide, dimethyl ether, etc., so that the solvent will rapidly evaporate from the solution of the resin, as when a stream of the solution is passed into air or water.

The polyvinyl ketals of the present invention have a multitude of uses because of their toughness, stability, and other desirable and useful properties. They are useful for the formation of laminated safety glass. The interlayers of the resin and the desired plasticizers, blended and mixed in the various ways of the art, can be prepared by extrusion methods, by slicing thin sheets from a cake of the material, by film casting, and other known means. Dibutyl sebacate, dibutyl phthalate, "Lorol" (a trade name for the long chain alcohols formed by the catalytic hydrogenation of coconut oil acids), and triethylene glycol dihexoate are particularly suitable plasticizers with the polyvinyl ketal of methyl ethyl ketone. Among those plasticizers which can be used in the preparation of suitable sheeting are: ethyl, propyl, amyl, and similar esters of phthalic acid; methyl, ethyl, butyl, amyl, and similar esters of aliphatic dibasic acids, such as adipic and sebacic acids; 2-methylpentoate, 2-ethylbutyrate, and similar esters of triethylene and other polyethylene glycols; the diacetates and triacetates, propionates, butyrates, hexoates, and similar esters of glycerol and ethylene glycol; polyphenyl-methanes; the toluenesulfonamides; the diphenyl ethers; the tributyl, triamyl, triphenyl, tricresyl, and similar phosphates; the 2-ethylbutyrate, n-hexoate, and similar esters of di- (and poly-) ethylene glycols; the butyl, amyl, and similar esters of aliphatic hydroxy acids, such as lactic and citric acids and their ethers; various esters and ethers of xylylene glycols; the chloronaphthalenes; the glycerol acetal esters, such as the butyraldehyde acetal of glycerol monoacetate, monopropionate, monobutyrate, etc.; the glycerol acetal ethers, such as the propionaldehyde acetal of glycerol monopropyl ethers, etc.; and any other plasticizers which might be found to be compatible with the polyvinyl ketals.

These polyvinyl ketals are useful either alone or in the presence of other resinous bodies, waxes, pigments, dyes, plasticizers, softeners, etc., for the coating of glass, including the interior of bulbs, wire and cable, metals, stone, brick, concrete, plaster, and similar material. They also are useful for the coating and impregnation of cloth, wood, textiles, and leather, and for the sizing of paper pulp and textile fibers. They can be used for the preparation of reinforced collars, cuffs, and similar articles of clothing. They also are useful as adhesives, as binders for abrasives, for the preparation of insulators, and for the preparation of threads, bands, tubes, and similar materials for surgical and other uses. They can also be used for decorative purposes, such as for the preparation of materials for curtains, and the like.

Films can be obtained by casting from organic solution, by hot pressing, and by extrusion, and are useful for cinematographic and photographic purposes, and also as wrapping materials and in the preparation of transparent display boxes, etc., lacquers, paints, varnishes, and enamels can be prepared from these resins, either alone or in the presence of other resinous materials, pigments, dyes, driers, fillers, cellulose materials, etc. Solutions of the resins are also useful as fingernail polishes. When in fiber form the polyvinyl ketals are useful as artificial silks.

These polyvinyl ketals are also useful for the preparation of molded articles. Either alone, or in the presence of materials, such as other resinous products, plasticizers, fillers, pigments, synthetic and natural waxes, etc., these ketals can be molded into a multitude of different shapes and articles, such as buttons, combs, dishes, containers, screw caps, tubes, phonograph records, and other types of molded products.

As many apparently widely different embodiments of this invention may be made without departing from the spirit and scope thereof, it is to be understood that the invention is not limited to the specific embodiments thereof except as defined in the appended claims.

We claim:

1. Process of preparing a polyvinyl ketal which comprises reacting polyvinyl alcohol with a monomeric ketal of a ketone having the formula: R—CO—R' in which R and R' are selected from the group consisting of aliphatic and aromatic hydrocarbon radicals, in a substantially anhydrous solvent vehicle in the presence of a condensation catalyst of acid reaction.

2. Process of preparing a polyvinyl ketal which comprises reacting polyvinyl alcohol with a mixture comprising a monomeric ketal of a ketone having the formula: R—CO—R' in which R and R' are selected from the group consisting of aliphatic and aromatic hydrocarbon radicals, and at least one other organic compound selected from the group consisting of aldehydes and cyclic ketones, in a substantially anhydrous solvent vehicle in the presence of a condensation catalyst of acid reaction.

3. Process of preparing a polyvinyl ketal which comprises reacting polyvinyl alcohol with a monomeric ketal of a ketone having the formula: R—CO—R' in which R and R' are selected from the group consisting of aliphatic and aromatic hydrocarbon radicals, in a substantially anhydrous solvent vehicle in the presence of a condensation catalyst of acid reaction, thereafter neutralizing the reaction mixture and, then, precipitating the polyvinyl ketal formed.

4. Process of preparing a polyvinyl ketal which comprises reacting polyvinyl alcohol with a mixture comprising a monomeric ketal of a ketone having the formula: R—CO—R' in which R and R' are selected from the group consisting of aliphatic and aromatic hydrocarbon radicals, and at least one other organic compound selected from the group consisting of aldehydes and cyclic ketones, in a substantially anhydrous solvent vehicle in the presence of a condensation catalyst of acid reaction, thereafter neutralizing the reaction mixture and, then, precipitating the polyvinyl ketal formed.

5. Process of preparing a polyvinyl ketal which comprises reacting polyvinyl alcohol with a dialkyl ketal of a ketone having the formula: R—CO—R' in which R and R' are selected from the group consisting of aliphatic and aromatic hydrocarbon radicals, in a substantially anhydrous solvent vehicle in the presence of a condensation catalyst of acid reaction, thereafter neutralizing the reaction mixture and, then, precipitating the polyvinyl ketal formed.

6. Process of preparing a polyvinyl ketal which comprises reacting polyvinyl alcohol with a dialkyl ketal of a lower aliphatic ketone in a substantially anhydrous solvent vehicle in the presence of a condensation catalyst of acid reaction, thereafter neutralizing the reaction mixture and, then, precipitating the polyvinyl ketal formed.

7. A polyvinyl ketal of polyvinyl alcohol and a ketone having the formula: R—CO—R', in which R and R' are aliphatic hydrocarbon radicals and in which over 60% of the hydroxyl groups of the polyvinyl alcohol have been ketalized.

8. A polyvinyl ketal of polyvinyl alcohol and a ketone having the formula: R—CO—R', in which R and R' are selected from the group consisting of aliphatic and aromatic hydrocarbon radicals, said ketal being characterized in that over 60% of the hydroxyl groups of the polyvinyl alcohol have been ketalized.

9. A polyvinyl ketal of polyvinyl alcohol and a ketone of the formula: R—CO—R', in which R and R' are lower aliphatic hydrocarbon radicals, said ketal being characterized in that over 60% of the hydroxyl groups of the polyvinyl alcohol have been ketalized.

10. A polyvinyl ketal of polyvinyl alcohol and methyl ethyl ketone, said ketal being characterized in that over 60% of the hydroxyl groups of the polyvinyl alcohol have been ketalized.

11. A polyvinyl ketal of polyvinyl alcohol and acetone, said ketal being characterized in that over 60% of the hydroxyl groups of the polyvinyl alcohol have been ketalized.

12. A polyvinyl ketal of polyvinyl alcohol and acetophenone, said ketal being characterized in that over 60% of the hydroxyl groups of the polyvinyl alcohol have been ketalized.

13. Process of preparing a polyvinyl ketal which comprises reacting polyvinyl alcohol with a dialkyl ketal of a lower aliphatic ketone in a substantially anhydrous solvent vehicle essentially consisting of a saturated monohydric aliphatic alcohol containing from 1 to 2 carbon atoms, inclusive, in the presence of sulfuric acid as a condensation catalyst, thereafter neutralizing the reaction mixture and, then, precipitating the polyvinyl ketal formed.

COURTLAND L. AGRE.
GEORGE L. DOROUGH.
WILLIAM E. HANFORD.

CERTIFICATE OF CORRECTION.

Patent No. 2,341,306. February 8, 1944.

COURTLAND L. AGRE, ET AL.

It is hereby certified that error appears in the printed specification of the above numbered patent requiring correction as follows: Page 1, first column, line 31, for "(non-polyeric)" read --(non-polymeric)--; and that the said Letters Patent should be read with this correction therein that the same may conform to the record of the case in the Patent Office.

Signed and sealed this 25th day of April, A. D. 1944.

Leslie Frazer

(Seal)     Acting Commissioner of Patents.